United States Patent [19]

Powers

[11] Patent Number: 4,490,800

[45] Date of Patent: Dec. 25, 1984

[54] DUAL HEAD GAUGER APPARATUS WITH AUTOMATIC ADJUSTMENT FOR PRESSURE VARIATION

[75] Inventor: Whitney S. Powers, Pine City, N.Y.

[73] Assignee: Powers Manufacturing, Inc., Elmira, N.Y.

[21] Appl. No.: 330,297

[22] Filed: Dec. 14, 1981

[51] Int. Cl.³ ................ G01N 7/00; G06G 7/12; G06F 15/20

[52] U.S. Cl. .................. 364/558; 364/563; 364/575; 364/478

[58] Field of Search ........... 364/473, 507, 551, 552, 364/558, 478; 73/37, 45.1, 41, 45.2

[56] References Cited

U.S. PATENT DOCUMENTS

| | | |
|---|---|---|
| 3,327,847 | 6/1967 | Lockshaw . |
| 3,387,704 | 6/1968 | Powers . |
| 3,464,547 | 9/1969 | Becker . |
| 3,464,549 | 9/1969 | Armbruster ............ 364/478 |
| 3,496,761 | 2/1971 | Powers . |
| 3,633,742 | 1/1972 | Melton . |
| 3,791,517 | 2/1974 | Friedman . |
| 3,805,036 | 4/1974 | Michaudet et al. . |
| 3,809,874 | 5/1974 | Pozzetti et al. ........... 364/575 |
| 3,814,241 | 6/1974 | Stein . |
| 3,916,673 | 11/1975 | Gass et al. . |
| 4,038,532 | 7/1977 | Burns et al. . |
| 4,047,000 | 9/1977 | Bryant et al. . |
| 4,081,991 | 4/1978 | Powers, Jr. ............ 73/41 |
| 4,109,511 | 8/1978 | Powers, Jr. et al. .......... 73/45.1 |
| 4,170,130 | 10/1979 | Bonner et al. . |
| 4,291,573 | 9/1981 | Richter et al. ........... 73/37 |

*Primary Examiner*—James D. Thomas
*Assistant Examiner*—Dale M. Shaw
*Attorney, Agent, or Firm*—Seidel, Gonda & Goldhammer

[57] ABSTRACT

An apparatus for testing the sealing surface finish and the internal diameter of the mouth and neck of sealable containers comprises means for pressurizing the container and providing a digital signal having a value indicative of the magnitude of the peak pressure in the container and means for providing a defect signal if there are any obstructions in the mouth or neck of the container. A microcomputer maintains a running average value of selected ones of previously produced digital signals, compares the most recently produced digital signal to the running average value and provides a reject signal if the value of the most recent digital signal fails to exceed a percentage of the running average value. The microcomputer also provides a reject signal if it detects the presence of a defect signal. An initial average value is computed based upon selected ones of the digital numbers initially produced and the running average value is periodically compared to a percentage of the initial average value. An alarm signal is provided if the running average value fails to exceed the percentage of the initial average value.

14 Claims, 5 Drawing Figures

DUAL HEAD GAUGER APPARATUS WITH AUTOMATIC ADJUSTMENT FOR PRESSURE VARIATION

BACKGROUND

This invention relates to an apparatus for testing containers, such as beverage bottles, which will be capped or otherwise closed by a vacuum seal, and for rejecting those containers which do not meet the requirements of a container which can be effectively sealed by a cap or other closure.

This apparatus incorporates the features disclosed and claimed in two of my previous patents, U.S. Pat. Nos. 3,387,704 and 3,496,761, which are hereby incorporated by reference.

U.S. Pat. No. 3,387,704 discloses a machine for gauging the neck diameter of glass bottles moving on a linear conveyor, and for automatically ejecting defective bottles from the conveyor line.

U.S. Pat. No. 3,496,761 discloses a machine for testing the sealing surface of the mouth of glass bottles moving on a linear conveyor, wherein the bottle mouth is covered by a test fixture having a nozzle surrounded by a springpressed sealing diaphragm. A metered volume of air is injected into the bottle through the nozzle, and the retention of pressure in the bottle is sensed by a differential-pressure switch. A defect in the sealing surface is detected by lower than expected pressure resulting from an unacceptably rapid leakage of air past the nozzle diaphragm. This causes the actuation of a switch for ejecting the defective bottle from the conveyor after it has passed beyond the testing area.

The above features disclosed and claimed in both of the above patents were combined into a single bottle testing apparatus. This combination apparatus has been commercially available for some time, and provides the background for understanding the improvement achieved by the present invention.

One of the problems encountered with the sealing surface testing portion of the prior device is that the pressure induced in the bottles from the injection of the measured volume of air varied with atmospheric temperature and pressure. Since the test for detecting an imperfect bottle sealing surface required a comparison by a differential pressure switch, the system was vulnerable to changes in atmospheric conditions. Acceptable bottles might give defective readings, or defective bottles give acceptable readings, unless the differential pressure switch was adjusted for changed atmospheric conditions. Moreover, gradual wear often reduced the volume of air delivered to the bottle, whereby the device would eventually begin rejecting acceptable bottles unless the differential pressure switch was adjusted to compensate for the reduced air volume. Finally, the pressure switch itself was vulnerable to wear and often needed to be replaced.

The improved system of the present invention replaces the differential pressure switch with a linear pressure transducer. The linear output of the pressure transducer is digitized. The digitized output is sent to a microprocessor, which computes a running average of the pressure developed in good bottles, and automatically adjusts the threshold to reject bottles which show finite pressures below a percentage of this running average. The running average thus makes a continuous correction for cylinder wear and atmospheric variations. The initial average pressure developed by the machine when it is first installed is saved in memory and compared at regular intervals to the current running average. If the running average pressure deteriorates below a selected percentage of the initial pressure, indicating excessive wear of the air cylinder, an alarm signal is produced which indicates that maintenance should be performed on the device.

A related advantage gained by the use of the microprocessor is that operating and accounting data can be generated, displayed and stored to give a historical summary of the operating performance of the apparatus and of the number of bottles rejected, the reason for rejection, and the percentages of each.

These and other advantages of the present invention will become apparent upon reading the detailed description of the disclosure which follows.

BRIEF SUMMARY OF THE INVENTION

A dual head gauger apparatus has sealing surface testing means and obstruction testing means for testing containers of the type having a mouth, a neck and a sealing surface. The sealing surface testing means tests the sealing surface finish of a container by sealing the surface of the container with a flexible diaphragm, injecting a metered volume of gas into the container and sampling the pressure existing in the container. The obstruction testing means detects obstructions in the mouth and neck of a container by projecting a gauge into the mouth and neck of the container. The gauge has a diameter substantially equal to the minimum internal diameter of the mouth and neck of an acceptable container. A linear pressure transducer receives the pressure sample from the sealing surface testing means and provides a first electrical signal which has a magnitude indicative of the instantaneous magnitude of the pressure sample. The output of the linear pressure transducer is applied to a peak level detector which provides a second electrical signal having a magnitude indicative of the peak magnitude of the first electrical signal. An analog to digital converter receives the second electrical signal and converts it into a digital signal having a value indicative of the magnitude of the second electrical signal.

A microswitch is operatively coupled to the obstruction testing means and provides a switch closure when an obstruction in the mouth or neck of a container is detected. A flip/flop is operatively connected to the microswitch and provides a defect signal when a switch closure occurs.

A microcomputer receives the digital signal from the analog to digital converter and the defect signal from the flip/flop. The microcomputer is programmed to compute a running average value of selected ones of previously produced digital signals and to compute an initial average value of selected ones of the digital signals initially provided by the analog to digital converter. The microcomputer also calculates a threshold value based on a percentage of the running value and compares the digital signal provided by the analog to digital converter to the threshold value. The microcomputer provides a reject signal when the value of the digital signal is less than the threshold value and when a defect signal is received from the flip/flop.

The occurrence of the reject signal initiates a tracking means which tracks the movement of a defective container from the test area to a rejection device which rejects the defective container.

The microcomputer compares the running average value to the initial average value at selected intervals and produces an alarm signal when the running average value fails to exceed a selected percentage of the initial average value.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DISCLOSURE

Figure 1:
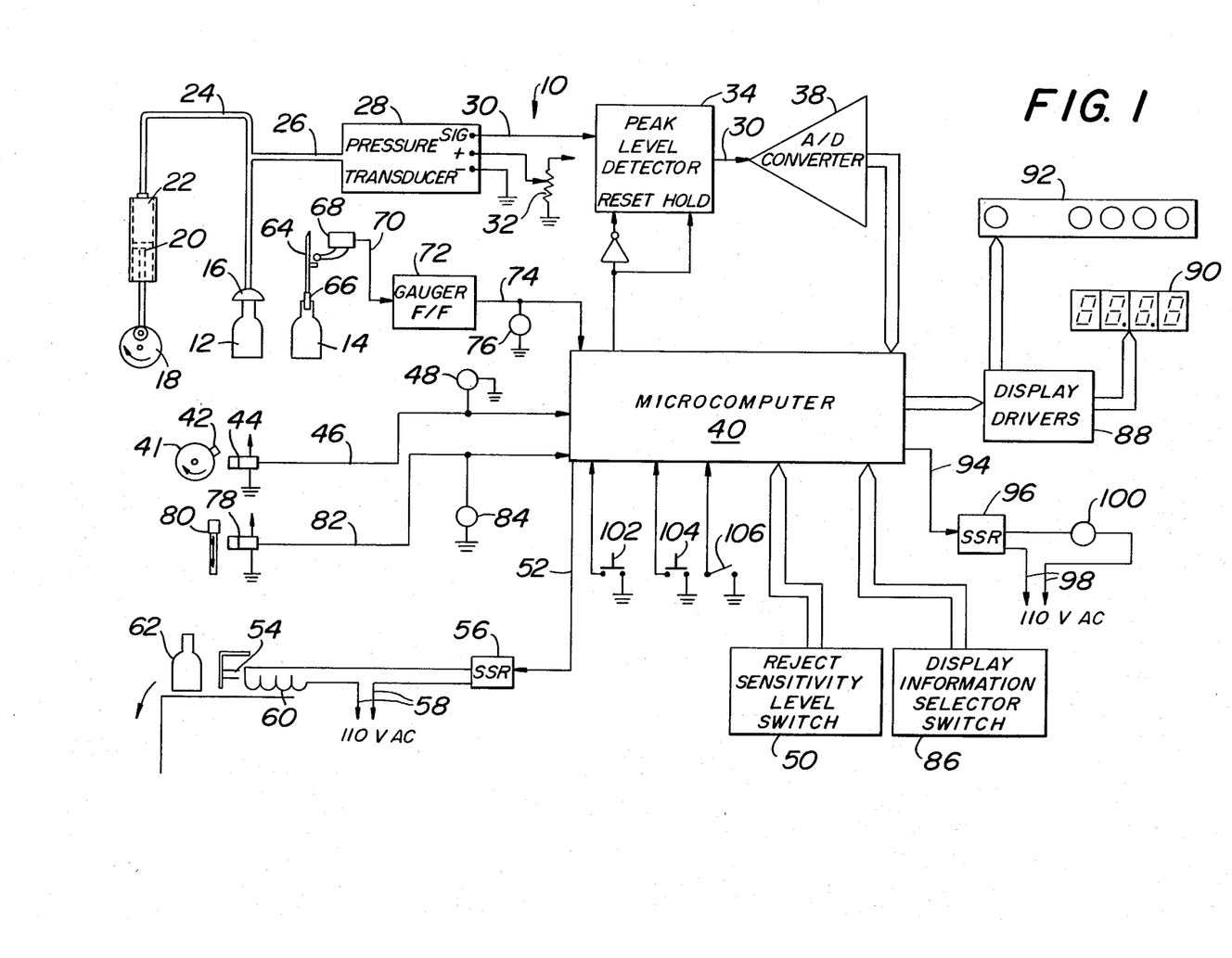
FIG. 1 is a block diagram of an apparatus according to the present invention.
Figure 2A:
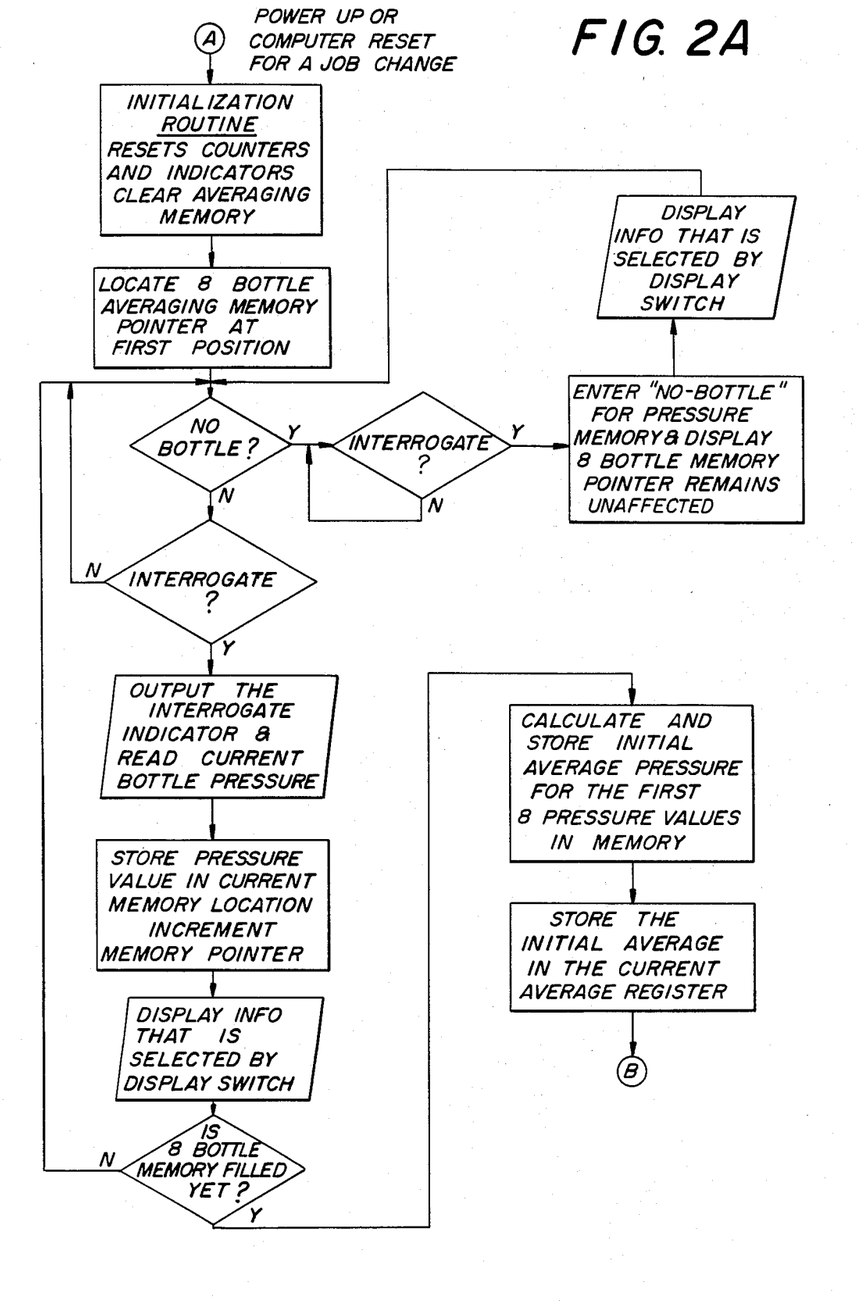
FIGS. 2A, 2B, 2C and 2D taken together form a composite flow chart of the control logic programmed into the microcomputer.
Figure 2B:
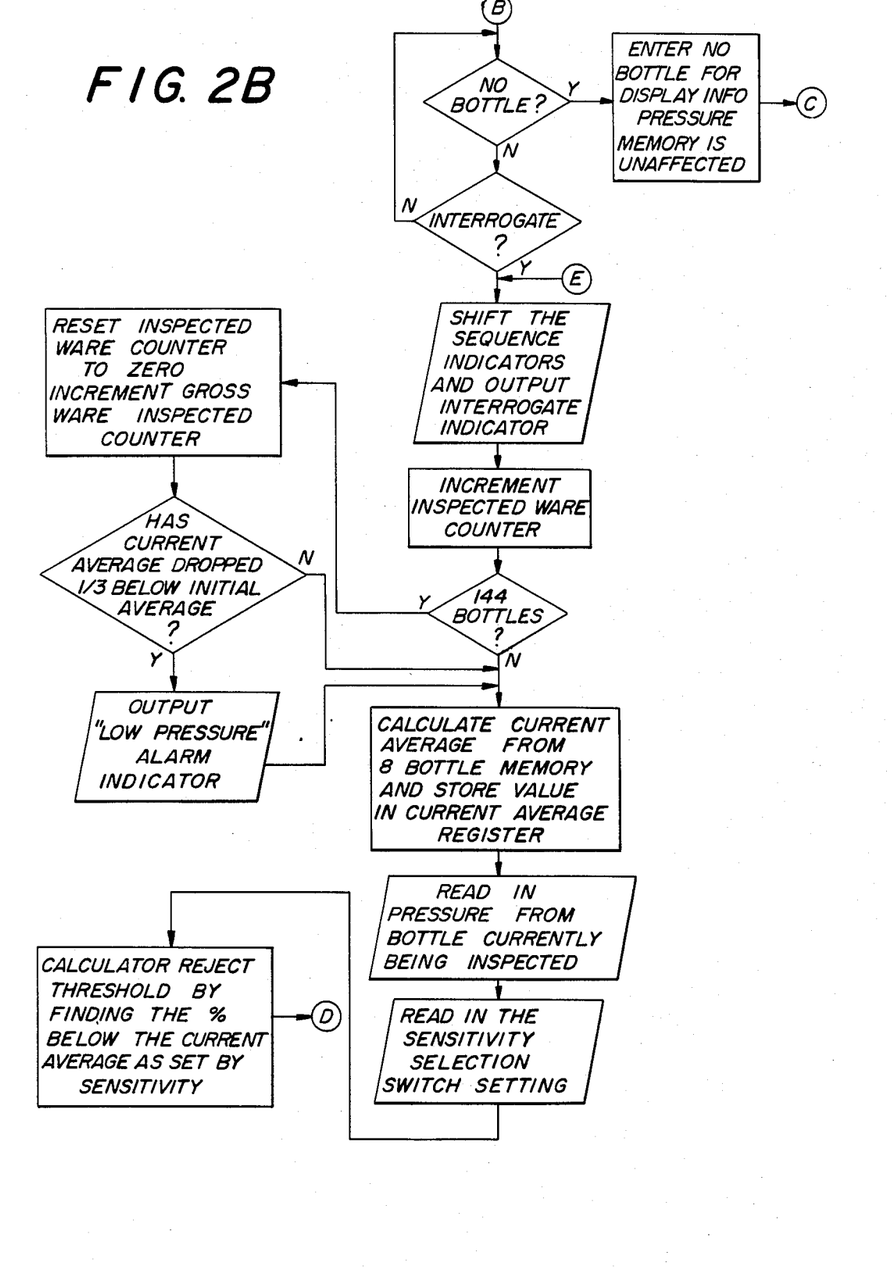
Figure 2C:
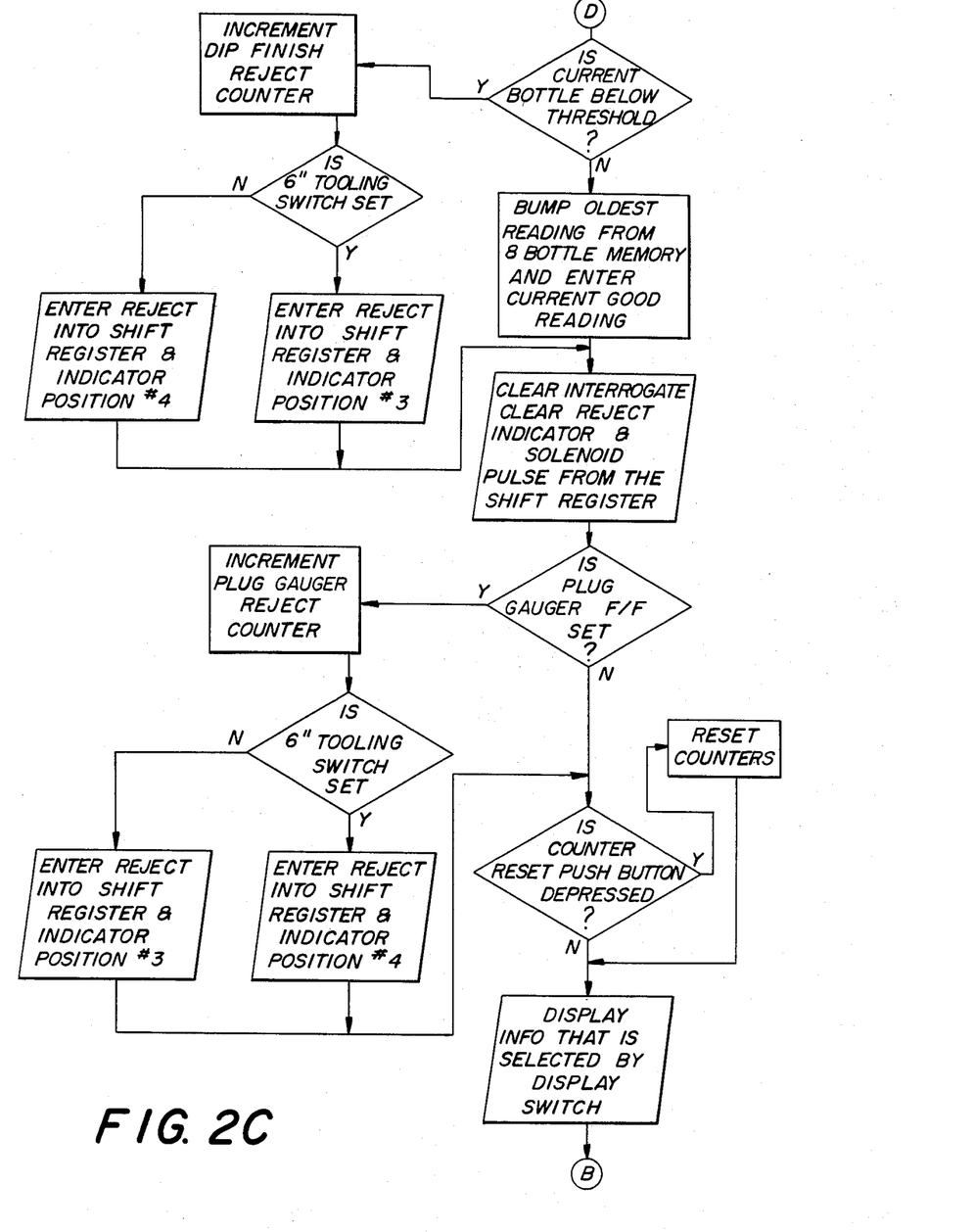
Figure 2D:
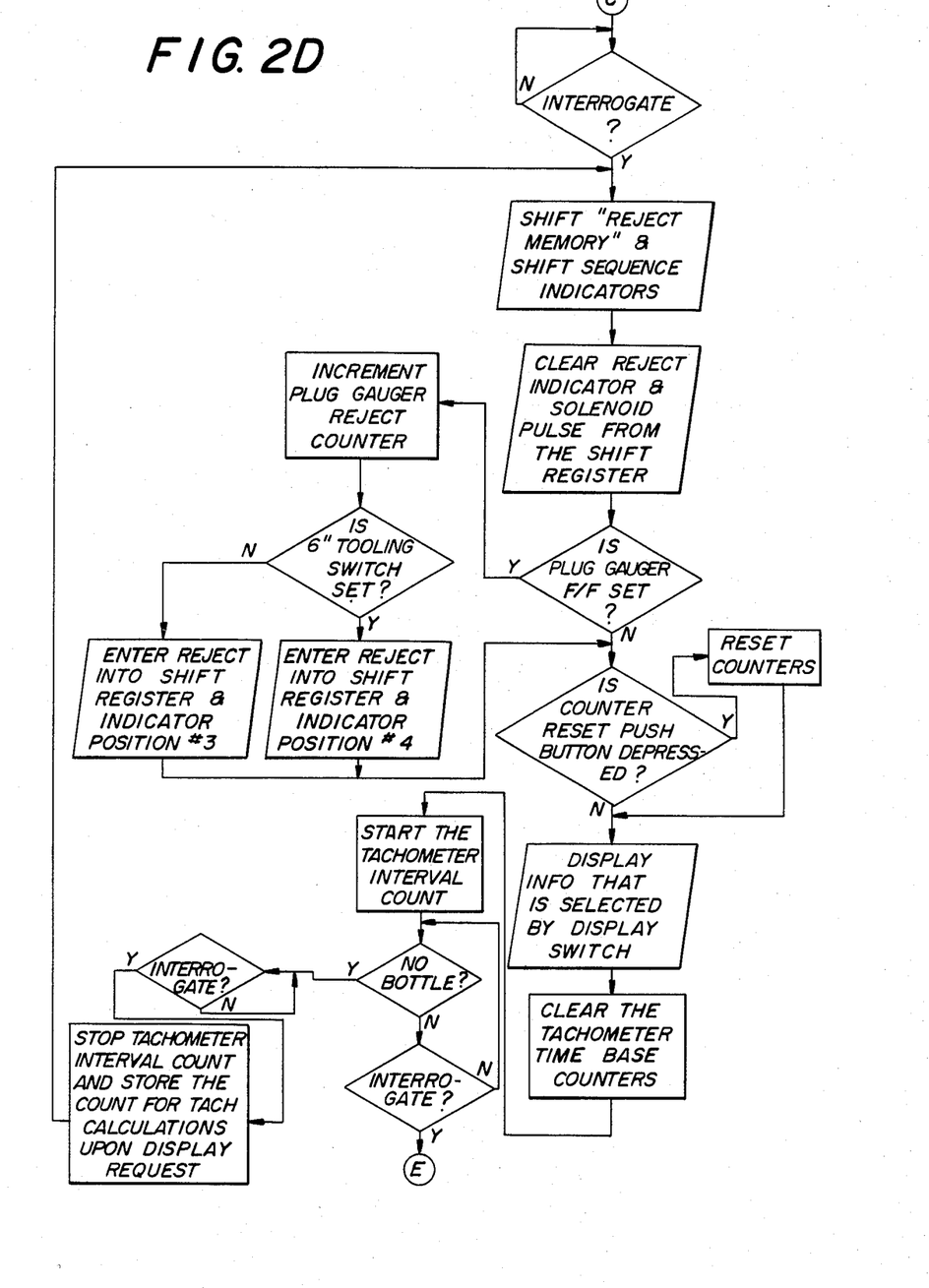

Referring to the drawings in detail, wherein like numerals indicate like elements, there is shown in FIG. 1 a block diagram of an apparatus 10 according to the present invention. Apparatus 10 is utilized to test bottles proceeding seriatim along a conveyor line. The tests performed include testing each bottle for a finish of a sealing surface on the rim of the bottle mouth, and testing the diameter of the mouth and neck of the bottle for proper size or constrictions. The conveyor line, and the related apparatus for coordinating the position of the bottles with the test apparatus 10 are not depicted in FIG. 1. Reference should be made instead to U.S. Pat. Nos. 3,387,704 and 3,496,761 for these details.

Instead, there is simply shown in FIG. 1 two bottles, 12 and 14, in positions under the relevant test portions of apparatus 10. It should be understood that the conveyor will move the bottles seriatim, that is, with bottle 14 moving into the position of bottle 12 and a new bottle taking the position of bottle 14 and so on throughout the sequence of testing for a batch of bottles. Bottle 12 is in position under machinery for testing the sealing surface of the bottle mouth. As disclosed and claimed in U.S. Pat. No. 3,496,761, a flexible diaphragm fitting 16 reciprocates downward and makes a sealing engagement with the mouth of bottle 12. A pump motor 18 reciprocates a piston 20 inside a cylindrical chamber 22, thus compressing a fixed volume of air along pressure tubing 24 through diaphragm 16 and into bottle 12. The pressure in tubing 24 and bottle 12 is tapped by line 26 and delivered to a linear pressure transducer 28. Pressure transducer 28 may be any of a variety of well known solid state devices for transforming a pressure signal into a proportional electrical signal. Pressure transducer 28 replaces the Barksdale pressure switch disclosed in U.S. Pat. No. 3,496,761. Transducer 28 converts the instantaneous pressure sample received along tubing 26 into a proportional electrical signal carried on symbolic conductor 30. The gain of pressure transducer 28, which sets the relative amplitude of the electrical signal on conductor 30 may be adjusted by a potentiometer 32.

The pressure-equivalent electrical signal on conductor 30 is input to a peak level detector 34, which may be any one of a number of commercially available intergrated circuits for detecting a peak signal. The output of peak detector 34 is a d.c. electrical signal proportional to the peak electrical signal received by detector 34 along conductor 30. This peak signal is connected along symbolic conductor 36 as an input to an analog to digital converter 38, which digitizes the peak signal into a form which can be input into a microcomputer 40. Microcomputer 40 can be any of a variety of commercially available microcomputers capable of performing the relatively simple calculations necessary for the operation of this apparatus.

The digitized peak pressure signal is held at the input to microcomputer 41 until an interrogate signal is received. An interrogate signal is generated each time the conveyor line moves one unit, i.e., when a new bottle position of the conveyor line moves under the diaphragm 16. This interrogate signal is generated by a mechanical cam switch 42 mounted on a cam 40 which is associated with the drive train of the conveyor in such manner that cam 41 makes one revolution for each unit of advance of the conveyor. Each time cam switch 42 passes directly in front of a proximity sensor 44, the proximity sensor produces an electrical signal on symbolic conductor 46 which is input to microcomputer 40. A small indicator LED 48 illuminates with each interrogate signal on conductor 46 to give a visual display each time the conveyor advances one unit. Promixity sensor 44 is preferably a magnetic proximity sensor.

A second proximity switch 78 detects the proximity of a "no bottle" indicator 80 whenever there is no bottle present under diaphragm 16. Proximity switch 78 thus provides a "no bottle" signal on symbolic conductor 82 whenever there is a gap in the bottle line on the conveyor. This signal illuminates an LED 84 and is also fed into microcomputer 40. Microcomputer 40 then inhibits the pressure test so that no pressure test is attempted on the empty position. Microcomputer 40 can be programmed to terminate operation of the entire apparatus if a selected number of "no bottle" signals are received seriatim such as two or five successive "no bottle" signals, indicating that the batch of bottles being tested is complete.

When the interrogate signal is received by microcomputer 40, the digitized peak pressure is read in to the microcomputer. Microcomputer 40 computes a running average of the peak pressures from the immediately previous eight bottles measured. This average is held in memory and is continuously updated by each new satisfactory pressure reading. A ten position switch labeled "reject sensitive level switch" 50 allows the user to select a sensitivity based on a percentage of the running average pressure, so that bottles whose pressure indicates below the selected sensitivity are rejected.

Microcomputer 40 receives the selected percentage level from switch 50 and computes a threshold value based on the selected percentage of the running average pressure. The digitized peak pressure level signal from the bottle under test is compared to this threshold value to determine if the bottle tests satisfactorily. If a bottle passes the test, microcomputer 40 drops the oldest of the previous eight pressure readings and computes a new running average using the other seven readings and the current pressure reading. Bottles failing the test do not enter the running average.

If the bottle fails the test, microcomputer 40 starts a shift register interval counter (not shown) which maintains a cumulative count of each interrogate signal received after the counter is started. The counter is preset to output a reject signal on symbolic conductor 52 when the cumulative count indicates that the defective bottle has traversed along the conveyor line to a position directly in front of a reject plunger 54. The reject signal on conductor 52 trips a solid state relay 56 which allows 110 volt a.c. power on conductors 58 to flow through ejector solenoid coil 60. Solenoid 60 provides motive power which reciprocates plunger 54 into defective bottle 62, shoving bottle 62 off the conveyor line and into a chute for collecting defective bottles.

It would be useful merely to provide an apparatus to perform the sealing pressure test described above. However, it is currently preferred that the test apparatus also perform a test to determine whether the mouth and neck of the bottle are unobstructed and of the desired diameter. Specific details of such a testing device are available in my U.S. Pat. No. 3,387,704. However, for purposes of this discussion, it is sufficient to simply understand that a reciprocating plunger 64 moves downward when a bottle 14 is in position directly below. A gauge 66 is mounted on the end of plunger 64 and has a diameter equal to the minimum acceptable bore diameter for the bottle mouth and neck. If a gauge 66 passes without obstruction through the mouth and neck of the bottle 14, the bottle is acceptable. If the plunger 66 is obstructed by a bore having a smaller diameter than acceptable or by an obstruction within the bore, one or more microswitches 68 are closed, and produce a signal on symbolic conductor 70. The signal on symbolic conductor 70 is applied to the input of flip-flop 72 and causes flip-flop 72 to put out a defect signal on conductor 74. The signal on conductor 74 causes a gauger test LED 76 to illuminate, and is also received at an input to the microcomputer 40. When microcomputer 40 receives an interrogate signal from cam switch 42, the defect signal, if any, on conductor 74 is read into microcomputer 40. As in the sequence described above for the pressure test, microcomputer 40 starts a different tachometer controlled counter which automatically puts out a reject signal on conductor 52 when the defective bottle is aligned with plunger 54. The tachometer counter for the gauge test is similar to the tachometer counter for the pressure test, but puts out the reject signal after a different number of counts since the gauge inspection is normally performed on a bottle just prior to or just after the pressure inspection.

Microcomputer 40 is also programmable to display real time and historical summary information of the bottles being tested. A ten position display information selector switch 86 allows the user to select the information he would like displayed. The information which may be displayed includes:
(1) pressure from each bottle,
(2) running average pressure of the previous eight bottles,
(3) number of bottles tested,
(4) number of bottles rejected,
(5) percentage of bottles rejected,
(6) number of bottles rejected for failing pressure test,
(7) percentage of bottles failing pressure test,
(8) number of bottles which failed the gauge test,
(9) percentage of bottles failing gauge test,
(10) machine speed.

The above information is read out of a memory of microcomputer 40 on command from the display selector switch 86 each time an interrogate signal is received from interrogate cam switch 42. This information is supplied to display drivers 88. Display drivers 88 cause the information to be displayed on an L.E.D. numerical display 90. A simple LED array 92 tracks the shift of a rejected bottle along the conveyor to plunger 54.

As indicated above, the average pressure computed from the first eight bottles to be tested is stored and held in the memory of microcomputer 40. Due to changing atmospheric conditions during the test, it is possible that the subsequent running average will differ significantly from this initial average. Since microcomputer 40 automatically sets a threshold level based on the running average, the variation caused by changed atmospheric conditions is automatically compensated. However, it is possible that a gradual leak or other malfunction in the pressure test apparatus will cause the running average to become incrementally lower to a point at which maintenance should be performed on the pressure system. This malfunction can be detected when the running average drops below a percentage of the initial average. It is preferable that microcomputer 40 be set to compare the running average to the initial average at 144-bottle intervals, and to detect when the running average drops below approximately two-thirds of the initial average. Another alternative is to use a weighted average of all satisfactorily tested bottles, with the oldest bottles receiving the lowest weighting factor.

Thus, microcomputer 40 regularly compares the running average with the initial average held in memory, and produces an output alarm signal on symbolic conductor 94 whenever the comparison indicates that the running average is less than two-thirds of the initial average. This alarm signal trips a solid state relay 96 which allows 110 volt a.c. current on conductors 98 to power an alarm 100. Alarm 100 can be a buzzer, bell or other indicating device.

Also provided for the control of microcomputer 40 is a program reset switch 102. When switch 102 is activated, the memory of microcomputer 40 is reset to an initial position, and a new cycle beginning with a new initial average pressure is started. There is also provided a counter reset switch 104. Switch 104 resets all of the counters holding historical summary data for the batch of bottles that were tested.

There is also provided a 6" tooling switch which automatically sets microcomputer 40 for a different spacing between bottles commonly known in the art as 6" tooling. Microcomputer 40 automatically adjusts the count for controlling reject solenoid 60 to compensate for the different bottle spacing.

It can be seen from the above that the apparatus herein described provides many advantages not found in the prior apparatus of this type. There is a significant advantage in the automatic compensation for atmospheric conditions achievable through the use of the microcomputer 40. Additionally, the use of proximity switches 44 and 78 eliminate microswitches of the prior apparatus which were subject to short lives from wear. Pressure transducer 28 operating in conjunction with microcomputer 40 eliminates the Barksdale pressure switch of the prior apparatus, which was not only inaccurate and difficult to set, but also needed to be readjusted quite frequently to compensate for changed atmospheric conditions and mechanical wear.

It should be noted that other types of sealing surface finish tests could be used in the present invention. For instance, a finish test which directly measures leak rate could be used. In that instance, a running average of the acceptable leak rates would be maintained and compared.

FIGS. 2A, 2B, 2C and 2D taken together form a composite flow chart of the control logic programmed into microcomputer 40. The composite flow chart is sufficiently labeled as to be self-explanatory, consequently no further discussion will be made. It is likely that other programs, or modifications of this program, could be written to accomplish the same result.

The apparatus described above also provides a significant advantage in providing a real time and historical summary display which enables the user to closely monitor his operation and the overall quality of the bottle batches being tested. Thus, the present apparatus is a significant and useful improvement over the prior apparatus of this type.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for testing the sealing surface finish of containers at a test area through which the containers are sequentially transported, comprising:
    (a) first means disposed at the test area for sealing the surface of the container with a flexible diaphragm, injecting a metered volume of gas into the container and providing a sample of the pressure existing in the container;
    (b) second means coupled to the first means for producing a digital signal having a value indicative of the magnitude of the peak pressure existing in the container; and
    (c) third means coupled to the second means for computing a running average value of selected ones of previously produced digital signals, calculating a threshold value based on a percentage of the running average value, comparing the most recently produced digital signal to the threshold value and producing a reject signal when the value of the most recently produced digital signal is less than the threshold value.

2. Apparatus according to claim 1 further comprising means initiated by the reject signal for tracking the movement of the container which caused the reject signal from the test area to a rejection device and for actuating the rejection device when the container which caused the reject signal is aligned with the rejection device.

3. Apparatus according to claim 2 wherein the threshold value is adjustable, further comprising sensitivity control means for selecting a desired threshold value.

4. Apparatus according to claim 3 further comprising:
    (a) memory means having an input coupled to said third means for storing data relating to the number of containers tested and the number of containers rejected; and
    (b) means for producing a display based upon the data stored in the memory means.

5. Apparatus according to claim 1 wherein the second means comprises a linear pressure transducer receiving the pressure sample from the first means and providing a first electrical signal having a magnitude indicative of the instantaneous magnitude of the pressure sample, a peak level detector receiving the first electrical signal and providing a second electrical signal indicative of the peak magnitude of the first electrical signal, and an analog to digital converter for converting the second electrical signal into a digital signal having a value indicative of the magnitude of the second electrical signal.

6. Apparatus according to claim 5 wherein the third means comprises a microcomputer programmed to compute the running average value, calculate the threshold value, compare the digital signal to the threshold value and produce the reject signal.

7. Apparatus according to claim 1 further comprising means for computing an initial average value of selected ones of the digital signals initially provided by the second means, comparing the running average value to the initial average value at selected intervals, and providing an alarm signal when the running average value fails to exceed a selected percentage of the initial average value.

8. Apparatus sequentially transporting sealable containers of the type having a mouth, a neck and a sealing surface through a test area for testing plural characteristics of the containers, comprising:
    (a) first means disposed at the test area for testing the sealing surface finish of the containers by sealing the surface of the container with a flexible diaphragm, injecting a metered volume of gas into the container and sampling the pressure existing in the container;
    (b) second means disposed at the test area for detecting obstructions in the mouth and neck of the container by projecting a gauge into the container;
    (c) third means coupled to the first means for producing a digital signal having a value indicative of the magnitude of the peak pressure in the container;
    (d) fourth means coupled to the second means for producing a defect signal if the second means detects that the mouth or neck is obstructed;
    (e) fifth means coupled to the third means and fourth means for computing a running average value of selected ones of previously produced digital signals, calculating a threshold value based upon a percentage of the running average value, comparing the most recently produced digital signal to the threshold value, and producing a reject signal when the value of the most recently produced digital signal is less than the threshold value and when a defect signal is produced by the fourth means.

9. Apparatus according to claim 8 further comprising means initiated by the reject signal for tracking the movement of the container which caused the reject signal from the test area to a rejection device and for actuating the rejection device when the container which caused the reject signal is aligned with the rejection device.

10. Apparatus according to claim 9 wherein the second means comprises a gauge disposed on the end of a plunger adapted to reciprocate into the mouth and neck of the container, the gauge having a diameter substantially equal to the minimum internal diameter of the mouth and neck of an acceptable container.

11. Apparatus according to claim 10 wherein the fourth means comprises a microswitch cooperating with the plunger, the microswitch closing when the reciprocation of the gauge is restricted, and a flip/flop having an input coupled to the microswitch and an output coupled to the fifth means, the flip/flop output providing the defect signal when the microswitch closes.

12. Apparatus according to claim 11 wherein the third means comprises a linear pressure transducer for converting the pressure sample into a first electrical signal having a magnitude indicative of the instantaneous magnitude of the pressure sample, a peak level detector receiving the first electrical signal and producing a second electrical signal having a magnitude indicative of the peak magnitude of the first electrical signal, and an analog to digital converter for converting the second electrical signal into a digital signal having a value indicative of the magnitude of the second electrical signal.

13. Apparatus according to claim 8 further comprising means for computing an initial average value of selected ones of the digital numbers initially provided by the second means, comparing the running average value to the initial average at selected intervals, and providing an alarm signal when the running average value fails to exceed a selected percentage of the initial average value.

14. Apparatus for testing containers of the type having a mouth, a neck and a sealing surface at a test area through which the containers are sequentially transported, comprising:
    (a) sealing surface testing means disposed at the test area for testing the sealing surface finish of a container by sealing the surface of the container with a flexible diaphragm, injecting a metered volume of gas into the container and sampling the pressure existing in the container;
    (b) obstruction testing means disposed at the test area for detecting obstructions in the mouth and neck of the container by projecting a gauge into the mouth and neck of the container, the gauge having a diameter substantially equal to the minimum internal diameter of the mouth and neck of an acceptable container;
    (c) linear pressure transducer means receiving the pressure sample from the sealing surface testing means for providing a first electrical signal having a magnitude indicative of the instantaneous magnitude of the pressure sample;
    (d) peak level detector means receiving the first electrical signal from the linear pressure transducer means for providing a second electrical signal having a magnitude indicative of the peak magnitude of the first electrical signal;
    (e) analog to digital converter means receiving the second electrical signal for converting the second electrical signal into a digital signal having a value indicative of the magnitude of the second electrical signal;
    (f) microswitch means coupled to the obstruction testing means for providing a switch closure when the obstruction testing means detects an obstruction in the mouth or neck of a container, and flip/flop means coupled to the microswitch means for sensing a switch closure and providing a defect signal;
    (g) microcomputer means receiving the digital signal from the analog to digital converter means and the defect signal from the flip/flop means and computing a running average value of selected ones of previously produced digital signals, computing an initial average value of selected ones of the digital signals initially provided by the analog to digital converter means, calculating a threshold value based on a percentage of the running average value, comparing the most recent digital signal provided by the analog to digital converter means to the threshold value, and producing a reject signal when the value of the most recent digital signal is less than the threshold value and when a defect signal is received, comparing the running average value to the initial average value at selected intervals and producing an alarm signal when the running average value fails to exceed a selected percentage of the initial average value;
    (h) tracking means initiated by the reject signal for tracking the movement of the container which caused the reject signal from the test area to a rejection device and for actuating the rejection device when the container which caused the reject signal is aligned with the rejection device.

* * * * *